US009223457B2

(12) United States Patent
Dillenberger et al.

(10) Patent No.: US 9,223,457 B2
(45) Date of Patent: *Dec. 29, 2015

(54) VISUALIZATION OF INFORMATION USING LANDMASSES

(71) Applicant: International Business Machines Corporation, Armonk, NY (US)

(72) Inventors: Donna E. Dillenberger, Yorktown Heights, NY (US); Sandra K. Johnson, Cary, NC (US); Joan L. Mitchell, Las Vegas, NV (US); David Ward, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/828,998

(22) Filed: Mar. 14, 2013

(65) Prior Publication Data

US 2013/0198721 A1 Aug. 1, 2013

Related U.S. Application Data

(63) Continuation of application No. 11/747,058, filed on May 10, 2007, now Pat. No. 8,413,112.

(51) Int. Cl.
*G06F 9/44* (2006.01)
*G06F 3/048* (2013.01)
*G06T 11/20* (2006.01)

(52) U.S. Cl.
CPC ...... *G06F 3/048* (2013.01); *G06F 8/73* (2013.01); *G06F 8/75* (2013.01); *G06T 11/206* (2013.01)

(58) Field of Classification Search
USPC ............... 717/104–106, 126, 133, 149, 172; 715/234, 236, 853; 345/419, 428, 440, 345/589, 619; 702/123; 707/805
IPC ............................ G06F 3/048,3/0481, 3/0484
See application file for complete search history.

(56) References Cited

U.S. PATENT DOCUMENTS

| | | | |
|---|---|---|---|
| 6,356,285 B1 | 3/2002 | Burkwald |
| 6,646,650 B2 | 11/2003 | Ohta |
| 6,874,123 B1 | 3/2005 | DeStefano |
| 7,730,460 B1 | 6/2010 | Warren |

OTHER PUBLICATIONS

U.S. Appl. No. 11/747,058, Office Action dated Nov. 25, 2011.
U.S. Appl. No. 11/747,058, Office Action dated Apr. 30, 2012.
U.S. Appl. No. 11/747,058, Office Action dated Nov. 8, 2012.
U.S. Appl. No. 11/747,058, Notice of Allowance and Fees Due dated Nov. 27, 2012.
Lieberman, Henry, "Graphics for Software Visualization", Visible Language Workshop, MIT, 1990, pp. 1-4.
Lieberman, Henry, "A Three-Dimensional Representation for Program Execution", IEEE, 1989, pp. 111-116.
Eick et al., "Seesoft—A Tool for Visualizing Line Oriented Software Statistics", IEEE, 1992, vol. 18, pp. 957-968.

*Primary Examiner* — Tuan Vu
(74) *Attorney, Agent, or Firm* — Lisa Ulrich; Hoffman Warnick LLC

(57) ABSTRACT

The present invention relates to the visualization of complex information using a set of navigable landmasses. A method for generating a visualization of a programming code base using a set of navigable landmasses in accordance with an embodiment of the present invention includes: representing each of a plurality of different code components using a respective landmass; adjusting a size of each landmass based on a number of lines of code in the code component corresponding to the landmass; and displaying the landmasses.

14 Claims, 4 Drawing Sheets

VISUALIZATION OF INFORMATION USING LANDMASSES

CROSS-REFERENCE TO RELATED APPLICATIONS

This application is a continuation of co-pending U.S. patent application Ser. No. 11/747,058, which received a Notice of Allowance on Nov. 27, 2012, and is hereby incorporated by reference in its entirety.

FIELD

The present invention relates to data, and more specifically relates to the visualization of complex information using a set of navigable landmasses.

BACKGROUND

A product or solution lifecycle includes a number of phases, including initial concept, design and development, testing, support, quality, etc. Each of these phases contains a plethora of information about the specific product or solution that is present in numerous knowledge repositories. As such, it is often difficult to find and understand specific or related information about a product of solution, and the interactions and intra-actions between various lifecycle phases.

SUMMARY

The present invention is directed to the visualization of complex information using a set of navigable landmasses, with specific information (e.g., source information for complex software code) associated with each landmass. Visualization of interactions between the elements of the data is also provided.

A first aspect of the present invention is directed to a method for generating a visualization of a programming code base using a set of navigable landmasses, comprising: representing each of a plurality of different code components using a respective landmass; adjusting a size of each landmass based on a number of lines of code in the code component corresponding to the landmass; and displaying the landmasses.

A second aspect of the present invention is directed to a system for generating a visualization of a programming code base using a set of navigable landmasses, comprising: a system for representing each of a plurality of different code components using a respective landmass; a system for adjusting a size of each landmass based on a number of lines of code in the code component corresponding to the landmass; and a system for displaying the landmasses.

A third aspect of the present invention is directed to a program product stored on a computer readable medium, which when executed, generates a visualization of a programming code base using a set of navigable landmasses, the computer readable medium comprising program code for: representing each of a plurality of different code components using a respective landmass; adjusting a size of each landmass based on a number of lines of code in the code component corresponding to the landmass; and displaying the landmasses.

A fourth aspect of the present invention is directed to a method for deploying an application for generating a visualization of a programming code base using a set of navigable landmasses, comprising: providing a computer infrastructure being operable to: represent each of a plurality of different code components using a respective landmass; adjust a size of each landmass based on a number of lines of code in the code component corresponding to the landmass; and display the landmasses The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
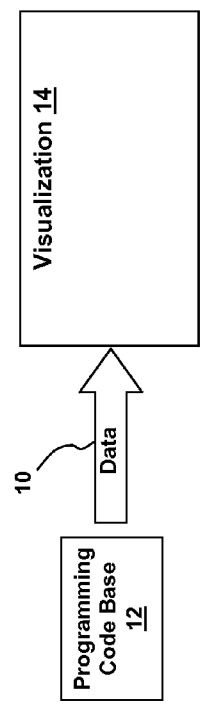
FIG. 1 depicts the visualization of a programming code base in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As detailed above, the present invention to the visualization of complex information using a set of navigable landmasses, with specific information (e.g., source information for complex software code) associated with each landmass. Visualization of interactions between the elements of the data is also provided.

The present invention can be used to visualize a large, complex programming code base. As depicted in FIG. 1, the present invention can be configured to take data 10 from a large programming code base 12 and provide a visualization 14 of the interprogramming calls, dependencies, code modification rate, code size, and/or the like, in the form of landmasses such as continents, countries, and states for code components. The visualization 14 can be two-dimensional as shown or three-dimensional. The landmasses used in the visualization 14 can comprise real or imaginary continents, countries, states, and/or the like.

Figure 2:
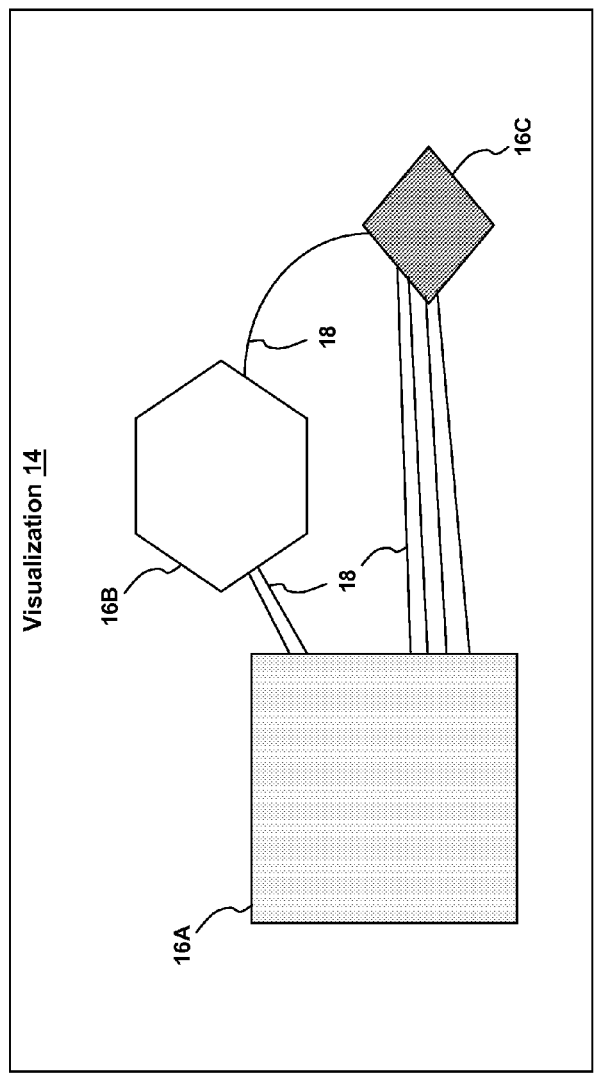
FIG. 2 depicts an illustrative example of a visualization of a programming code base in accordance with an embodiment of the present invention.

An illustrative example of a visualization 14 of a programming code base 12 in accordance with an embodiment of the present invention is depicted in FIG. 2. In this example, the size of each landmass 16 is proportional to the line count of code of the code component associated with the landmass 16. To this extent, a user can easily determine from FIG. 2 that the code component associated with landmass 16A contains a larger number of lines of code than the code component associated with landmass 16B or landmass 16C, while the code component associated with landmass 16B contains a larger number of lines of code than the code component associated with landmass 16C. Although only three landmasses 16A-16C are depicted in FIG. 2, any number of landmasses 16 can be used in the practice of the present invention. Further, each of the landmasses 16A-16C can also include additional landmasses (e.g., a country in a continent), those landmasses can include other landmasses (e.g., a state in a country), and so on. The sizes of each of these landmasses can proportional to the line count of code of the code component associated with the landmass.

The code modification change rate of the code component associated with each landmass can be reflected by the depth of color of the landmasses. For example, a user can easily determine from FIG. 2 that the code modification change rate of the code component associated with the landmass 16C is greater than the code modification change rates of the code components associated with the landmasses 16A and 16B, since the landmass 16C has a deeper depth of color than the landmasses 16A and 16B. Similarly, a user can easily determine from FIG. 2 that the code modification change rate of the code component associated with the landmass 16A is greater than the code modification change rate of the code component associated with the landmass 16B, since the landmass 16A has a deeper depth of color than the landmass 16B. Further, the white color of the landmass 16B can be used to indicate that the code modification change rate of the code component associated with the landmass 16B is close to or at zero. Although depth of color is used in this example to indicate the code modification change rate of the code components associated with the landmasses 16A-16C, other methodologies for distinguishing the landmasses 16A-16C based on code modification change rate can also be used. For example, in a three-dimensional sense, the relative height of each landmass 16 can be used to indicate the code modification change rates of each landmass 16.

The interconnections 18 between the landmasses 16A-16C reflect the level of interconnectivity between the corresponding code components. This visualization also brings together disparate sources of data: problem reporting sources, design databases, test case repositories, original anecdote repositories from developers, architects, testers and people who have worked on the code components through time, etc., and links these sources to the pertinent landmass. In FIG. 2, for example, it can easily be determined, based on the number of interconnections 18, that the code component associated with landmass 16A is more highly connected to the code component associated with landmass 16C than to the code component associated with landmass 16B. Likewise, it can easily be determined that the code component associated with landmass 16B is more highly connected to the code component associated with landmass 16A than to the code component associated with landmass 16C. Although shown as terminating at the periphery of the landmasses 16A-16C for clarity of illustration, it should be noted that one or more of the interconnections 18 can terminate at a landmass located within another landmass (e.g., at a country within a continent). In general, any landmass 16 in the visualization 14 can be connected to any other landmass 16 via an interconnection 18.

Figure 3:
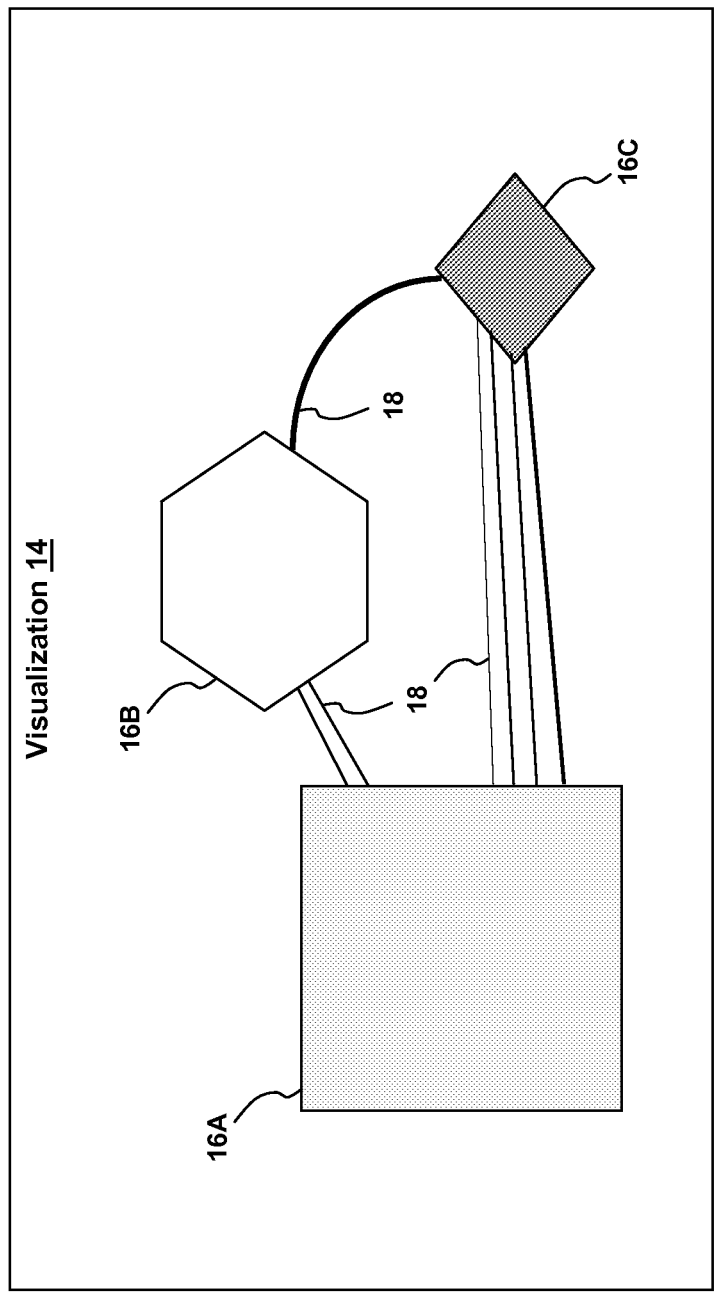
FIG. 3 depicts another illustrative example of a visualization of a programming code base in accordance with an embodiment of the present invention.

Another visualization feature of the present invention is the use of real time flow or trace data to see thread level activity among the code components and the resources the active threads share and use. This can be achieved, for example, by dynamically varying the color, thickness, darkness, or type of line (e.g., dashed) used to represent an interconnection 18 between landmasses 16, based on thread level activity. Other techniques, such as animation, etc., can also be used. An example of this is depicted in FIG. 3, where the thickness of each interconnection 18 indicates the relative level of thread level activity among the code components represented by the landmasses 16 (the thicker the interconnection, the greater the level of thread level activity).

The present invention can also be used to visualize assurance enablement. Consider, for example, a repository of federated information about the lifecycle of a product or a solution. This can include, for example, information about development, test (e.g., unit test, Function Verification Testing (FVT), System Verification Testing (SVT), integration, performance etc., test scripts and owners for each phase, etc.), support (e.g., known issues and associated resolution), and the like. The present invention takes information about the various lifecycle phases and provides visualization of the offering.

Figure 4:
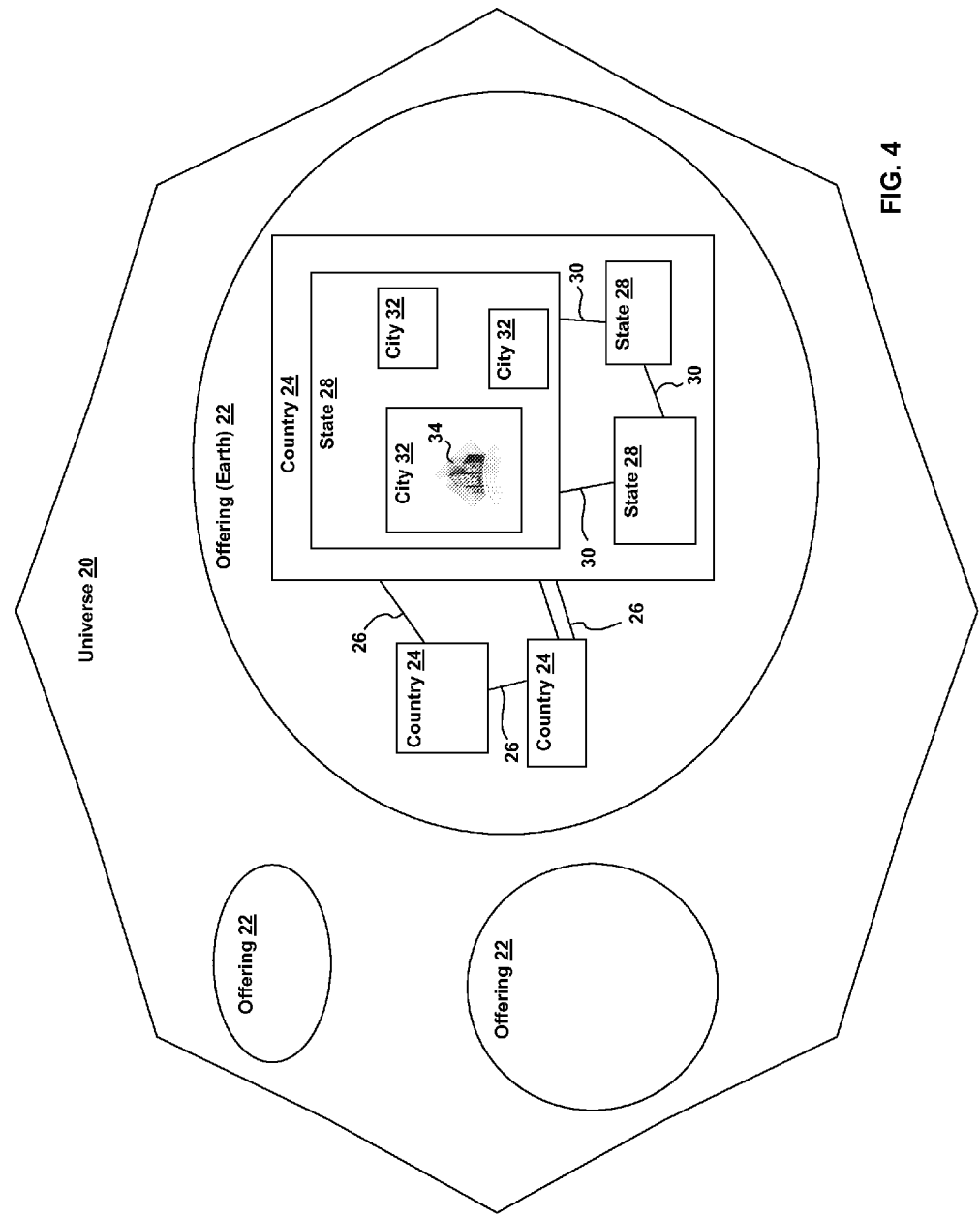
FIG. 4 depicts an illustrative example of a visualization of an assurance enablement using a universe in accordance with an embodiment of the present invention.

For example, as depicted in FIG. 4, a universe 20 is portrayed as a collection of offerings 22. In this embodiment, Earth is a specific offering (e.g., solution), a country 24 portrays each component of the solution (e.g., product, solution building block, etc.), country linkages 26 contain information about how the components work together as the solution, states 28 portray the various product phases such as development, test, support, etc., and interstate highways 30 contain linkages between information about development, test, support, etc. In addition, cities 32 can be used to reflect specific information about a phase. For example, for the test phase, the various cities portray unit test, FVT, system test, integration test, performance test, etc. Buildings 34 within a city 32 can be used to reflect test scripts, etc.

The characteristics of the solution or product can be reflected in the landmasses, in a manner similar to that discussed above with regard to FIG. 2. For example, the depth of the color of a landmass can be used to reflect the solution or product update rates, or the average time to resolution for support issues found in the field for the product or solution. The interconnections between the landmasses can be used to reflect the level of interconnectivity between code components. The types of linkages or physical/virtual connections among components that compose the solution, or across the various phases, can be reflected in the size/color of the connections of the landmasses, states, etc.

Another visualization feature of the present invention is the ability to leverage information across phases (e.g., test, development, support, etc.) to see activity among the components of a solution, and the resources they share in resolving an issue or improve the offering's design.

Figure 5:
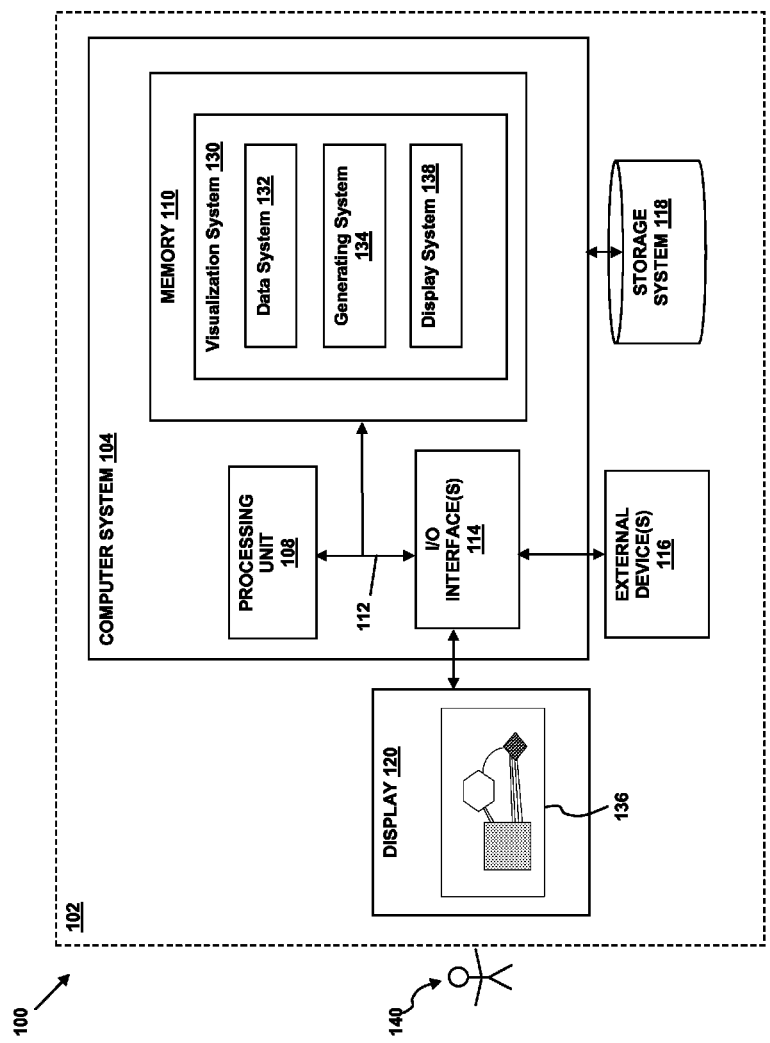
FIG. 5 depicts an illustrative computer system for implementing embodiment(s) of the present invention.

FIG. 5 depicts an illustrative system 100 for the visualization of complex information using a set of navigable landmasses, in accordance with any/all embodiments of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as a visualization system 130, that is stored in memory 110 and/or storage system 118. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The visualization system 130 is configured to implement any/all embodiments of the of the present invention, as detailed above. For example, the visualization system 130 can comprise a data system 132 for obtaining data to be visualized, a generating system 134 for generating a visualization 136 of the data based on user specified and/or predefined criteria, and a display system 138 for displaying the visualization 136 to a user 140.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 5 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for generating a visualization of a programming code base using a set of navigable landmasses, comprising:
   representing each of a plurality of different code components using a respective landmass;
   adjusting a size of each landmass based on a number of lines of code in the code component corresponding to the landmass;
   connecting a plurality of the landmasses using a number of interconnections, wherein the number of interconnections between each of the plurality of landmasses reflects a level of interconnectivity between the corresponding code components of the interconnected landmasses, and wherein a higher number of interconnections indicates a higher level of connectivity between the interconnected landmasses than a lower number of interconnections, wherein interconnectivity between the corresponding code components is based upon a number of common lines of code between the code components represented by the interconnected landmasses;
   displaying the landmasses and the interconnections between the landmasses, wherein each landmass includes other landmasses displayed within each respective landmass, and wherein a size of each of the other landmasses displayed within each respective landmass is adjusted based on a number of lines of code in the code component corresponding to each of the other landmass;

adjusting a displayed characteristic of a landmass based on a code modification change rate of the corresponding code component,
wherein display characteristic of an interconnection dynamically varies based on activity between the code components of the interconnected landmasses.

2. The method of claim 1, further comprising:
dynamically varying a displayed characteristic of an interconnection based on thread level activity between the code components of the interconnected landmasses.

3. The method of claim 2, wherein the displayed characteristic is selected from the group consisting of a color, a thickness, a darkness, and a type of line.

4. The method of claim 1, wherein the characteristic is selected from the group consisting of a depth of color and a height,
wherein, in the case that the characteristic includes the depth of color, the depth of color of the landmass is greater for the landmass than for another landmass having a lesser code modification change rate, and
wherein, in the case that the characteristic includes the height, the height of the landmass is greater for the landmass than for another landmass having a lesser code modification change rate.

5. The method of claim 1, wherein the other landmasses displayed within each respective landmass are displayed as being contained within a boundary of the respective landmass.

6. A system for generating a visualization of a programming code base using a set of navigable landmasses, the system including a computer system having a processing unit and a memory, the computing system executing computer program code which, upon execution, causes the computing system to perform actions comprising:
representing each of a plurality of different code components using a respective landmass;
adjusting a size of each landmass based on a number of lines of code in the code component corresponding to the landmass;
connecting a plurality of the landmasses using a number of interconnections, wherein the number of interconnections between each of the plurality of landmasses reflects a level of interconnectivity between the corresponding code components of the interconnected landmasses, and wherein a higher number of interconnections indicates a higher level of connectivity between the interconnected landmasses than a lower number of interconnections, wherein interconnectivity between the corresponding code components is based upon a number of common lines of code between the code components represented by the interconnected landmasses;
displaying the landmasses and the interconnections between the landmasses and
adjusting a displayed characteristic of a landmass based on a code modification change rate of the corresponding code component;
wherein each landmass includes other landmasses displayed within each respective landmass,
wherein a size of each of the other landmasses displayed within each respective landmass is adjusted based on a number of lines of code in the code component corresponding to each of the other landmass, and
wherein display characteristic of an interconnection dynamically varies based on activity between the code components of the interconnected landmasses.

7. The system of claim 6, wherein the computer system performs actions further comprising:
dynamically varying a displayed characteristic of an interconnection based on thread level activity between the code components of the interconnected landmasses.

8. The system of claim 7, wherein the displayed characteristic is selected from the group consisting of a color, thickness, darkness, and type of line,
wherein, in the case that the characteristic includes the depth of color, the depth of color of the landmass is greater for the landmass than for another landmass having a lesser code modification change rate, and
wherein, in the case that the characteristic includes the height, the height of the landmass is greater for the landmass than for another landmass having a lesser code modification change rate.

9. The system of claim 6, wherein the displayed characteristic is selected from the group consisting of: a depth of color and a height.

10. The system of claim 6, wherein the other landmasses displayed within each respective landmass are displayed as being contained within a boundary of the respective landmass.

11. A computer program product stored on a non-transitory computer readable medium, which when executed, generates a visualization of a programming code base using a set of navigable landmasses, the computer readable medium comprising program code for:
representing each of a plurality of different code components using a respective landmass;
adjusting a size of each landmass based on a number of lines of code in the code component corresponding to the landmass;
connecting a plurality of the landmasses using a number of interconnections, wherein the number of interconnections reflects a level of interconnectivity between the corresponding code components of the interconnected landmasses, and wherein a higher number of interconnections indicates a higher level of connectivity between the interconnected landmasses than a lower number of interconnections, wherein interconnectivity between the corresponding code components is based upon a number of common lines of code between the code components represented by the interconnected landmasses;
displaying the landmasses and the interconnections between the landmasses, wherein each landmass includes other landmasses displayed within each respective landmass,
wherein a size of each of the other landmasses displayed within each respective landmass is adjusted based on a number of lines of code in the code component corresponding to each of the other landmass; and
adjusting a displayed characteristic of a landmass based on a code modification change rate of the corresponding code component,
wherein display characteristic of an interconnection dynamically varies based on activity between the code components of the interconnected landmasses.

12. The computer program product of claim 11, wherein the other landmasses displayed within each respective landmass are displayed as being contained within a boundary of the respective landmass.

13. A method for deploying an application for generating a visualization of a programming code base using a set of navigable landmasses, comprising:
providing a computer infrastructure being operable to:
represent each of a plurality of different code components using a respective landmass;

adjust a size of each landmass based on a number of lines of code in the code component corresponding to the landmass;

connect a plurality of the landmasses using a number of interconnections, wherein the number of interconnections reflects a level of interconnectivity between the corresponding code components of the interconnected landmasses, and wherein a higher number of interconnections indicates a higher level of connectivity between the interconnected landmasses than a lower number of interconnections;

wherein interconnectivity between the corresponding code components is based upon a number of common lines of code between the code components represented by the interconnected landmasses;

wherein display characteristic of an interconnection dynamically varies
based on activity between the code components of the interconnected landmasses;

display the landmasses and the interconnections between the landmasses; and adjust a displayed characteristic of a landmass based on a code modification change rate of the corresponding code component, wherein the characteristic is selected from the group consisting of a depth of color and a height, wherein, in the case that the characteristic includes the depth of color, the depth of color of the landmass is greater for the landmass than for another landmass having a lesser code modification change rate, and wherein, in the case that the characteristic includes the height, the height of the landmass is greater for the landmass than for another landmass having a lesser code modification change rate.

14. The method of claim 13, wherein the adjusting of the displayed characteristic is performed in response to a change in the number of lines of code in the code component corresponding to the landmass.

\* \* \* \* \*